United States Patent
Rothschild

(10) Patent No.: US 9,300,723 B2
(45) Date of Patent: *Mar. 29, 2016

(54) ENABLING SOCIAL INTERACTIVE WIRELESS COMMUNICATIONS

(75) Inventor: Leigh M. Rothschild, Sunny Isles Beach, FL (US)

(73) Assignee: Display Technologies, LLC, Plano, TX (US)

( * ) Notice: Subject to any disclaimer, the term of this patent is extended or adjusted under 35 U.S.C. 154(b) by 398 days.

This patent is subject to a terminal disclaimer.

(21) Appl. No.: 13/494,097

(22) Filed: Jun. 12, 2012

(65) Prior Publication Data

US 2012/0254360 A1    Oct. 4, 2012

Related U.S. Application Data

(63) Continuation-in-part of application No. 11/999,570, filed on Dec. 7, 2007, now Pat. No. 8,671,195.

(51) Int. Cl.
| | | |
|---|---|---|
| *G06F 15/16* | (2006.01) | |
| *H04L 29/08* | (2006.01) | |
| *H04L 29/06* | (2006.01) | |
| *H04W 12/08* | (2009.01) | |

(52) U.S. Cl.
CPC ............ *H04L 67/06* (2013.01); *H04L 63/0209* (2013.01); *H04L 63/10* (2013.01); *H04L 63/20* (2013.01); *H04W 12/08* (2013.01)

(58) Field of Classification Search
CPC ..... H04L 63/00; H04L 63/0209; H04L 63/10; H04L 67/06; H04L 65/1069; H04L 67/14; H04L 63/20; H04W 12/08
USPC ........ 701/33; 370/338, 395.52; 709/223, 203, 709/225, 229, 217; 455/420
See application file for complete search history.

(56) References Cited

U.S. PATENT DOCUMENTS

| | | |
|---|---|---|
| 4,672,572 A | 6/1987 | Alsberg |
| 5,555,407 A | 9/1996 | Cloutier et al. |
| 5,694,546 A | 12/1997 | Reisman |
| 5,805,442 A | 9/1998 | Crater et al. |
| 5,857,187 A | 1/1999 | Uenoyama et al. |
| 5,892,825 A | 4/1999 | Mages et al. |
| 5,915,093 A | 6/1999 | Berlin et al. |

(Continued)

OTHER PUBLICATIONS

"Bluetooth Demystified", Nathan J. Muller, 2000, chapter 8, pp. 290-304.*
Takahashi, D., "A New Medium—The Bridge Solution; CD-Roms help give the illusion that the PC has No Limits . . . " The Wall Street Journal, Dow Jones & Co., Mar. 20, 1997.
Ladd, E., "The Document Tags," Oct. 23, 2006, retrieved from the Internet: <http://www.sunsite.serc.iisc.ernet.in/virlib/html/platinum/ch4.htm>.

(Continued)

*Primary Examiner* — Jungwon Chang
(74) *Attorney, Agent, or Firm* — Greer, Burns & Crain, Ltd.

(57) ABSTRACT

A transfer system from transferring a media file includes a vehicle media system and a wireless mobile device. The vehicle media system includes a wireless receiver, a security measure, and a processor configured to wirelessly detect the wireless mobile device, and receive, using the wireless receiver, the media file from the wireless mobile device. The wireless mobile device includes a wireless transmitter, and a processor configured to wirelessly detect the vehicle media system, and transmit, using the wireless receiver, the media file from the wireless mobile device. At least one of the wireless mobile device and vehicle media system is configured to create a wireless connection between the vehicle media system and the wireless mobile device, and the wireless connection does not include the security measure.

50 Claims, 4 Drawing Sheets

(56) References Cited

U.S. PATENT DOCUMENTS

| | | | |
|---|---|---|---|
| 5,922,045 | A | 7/1999 | Hanson |
| 5,937,158 | A | 8/1999 | Uranaka |
| 5,996,000 | A | 11/1999 | Shuster |
| 6,101,534 | A | 8/2000 | Rothschild |
| 6,145,088 | A | 11/2000 | Stevens |
| 6,594,692 | B1 | 7/2003 | Reisman |
| 7,631,084 | B2 | 12/2009 | Thomas et al. |
| 7,711,783 | B1 | 5/2010 | Violleau et al. |
| 6,101,534 | C1 | 6/2011 | Rothschild |
| 2004/0128375 | A1 | 7/2004 | Rockwell |
| 2004/0133631 | A1* | 7/2004 | Hagen et al. ............. 709/203 |
| 2005/0226254 | A1* | 10/2005 | Vimpari ............. 370/395.52 |
| 2007/0094366 | A1* | 4/2007 | Ayoub ............. 709/223 |
| 2008/0120369 | A1 | 5/2008 | Gustavsson |
| 2008/0220760 | A1* | 9/2008 | Ullah ............. 455/420 |
| 2009/0046677 | A1* | 2/2009 | Toledano et al. ............. 370/338 |
| 2009/0150554 | A1 | 6/2009 | Rothschild |
| 2010/0063670 | A1* | 3/2010 | Brzezinski et al. ............. 701/33 |
| 2011/0202993 | A1 | 8/2011 | Rothschild |

OTHER PUBLICATIONS

Creative Wonders/Electronic Arts. "ABC News Links—from CD-ROM Access," Aug. 17, 2007, retrieved from the Internet: <http://www.cdaccess.com/html/pc/abcnews.htm>.

Krushenisky, C., "Reference Resources That Make the Best Reports Even Better," Smart Computing, Aug. 17, 2007, retrieved from the Internet: <http://www.smartcomputing.com>.

Iqbal, M.S., et al., "A Simplified and an Efficient Packet Level Internet Access Control Scheme," Ethertech Conslt. Ltd., UK, 1992.

Heylighen, F., "World Wide Web: a distributed hypermedia paradigm for global networking," SHARE Europe Spring Conference, pp. 355-368, Brussels, Belgium, Apr. 1994.

Citrix Winview for Networks Installation Guide, Citrix Systems, Inc., 1990. Version WV.2.3.emj.

Reisman, R.R., "Raising a Bumper Crop of CD-ROM Hybrids," Mass High Tech. Mass Tech Times, Inc., Boston, MA, Sep. 2, 1996, vol. 14, No. 29, p. 17.

Britton, M, et al., "Discover Desktop Conferencing with Netmeeting 2.0," IDG Books Worldwide, Inc., 1997.

* cited by examiner

ENABLING SOCIAL INTERACTIVE WIRELESS COMMUNICATIONS

CROSS-REFERENCE TO RELATED APPLICATIONS

This application is a Continuation-in-Part of U.S. application Ser. No. 11/999,570, filed on Dec. 7, 2007, which is incorporated herein by reference in its entirety.

BACKGROUND

1. Field

The present disclosure is generally related to a digital media communication protocol structured to facilitate transferring and/or transmitting one or more digital media files to and/or from a media terminal and a media node via at least one interactive computer network.

2. Description of the Related Art

As technology continues to develop and play a significant role in today's society, a vast majority of portable devices, including mobile telephones, cellular telephones, portable MP3 players, handheld or portable game consoles, Personal Digital Assistants ("PDA"), etc. are equipped with memory devices, such as hard drives and/or removable flash or memory cards, which are capable of holding or storing large amounts of data and or digital media files including digital photographs, videos, audio/music files, etc. Accordingly, with the advent of such devices having these capabilities, individuals or users are more inclined to carry around their media files, such as, for example, digital photo albums, family videos, and/or favorite music tracks.

The drawback to the above noted portable media devices, however, is that many of the devices include relatively small display screens, some of which display poor quality photos and/or videos. In addition, the speakers associated with the corresponding portable device(s) are typically rather small and produce minimal or poor sound therefrom.

In addition, the individuals or users of the media devices may desire to share the digital media files and/or transfer, display, or play the files on a computer or other media device equipped with a larger or better quality screen, or having higher quality speakers than that disposed on the portable device(s). In addition, some media devices may have better editing software, or have access to the World Wide Web to further distribute the digital media files.

Accordingly, it would be advantageous if the digital media communication protocol of the present specification is structured to facilitate transferring or transmitting one or more digital media files between two or more media devices, such as a media terminal and/or a media node, via at least one interactive computer network. In particular, it would be beneficial if the digital media communication protocol includes a communication link structured to bypass at least one or more security measures, such as a password and/or firewall, employed by the interactive computer network, the corresponding networking devices, and/or the particular media devices themselves.

In addition, once the communication link is established it would be particularly beneficial if the various media devices, including the media terminal(s) and/or media node(s), are structured to display, save, edit, manipulate, and/or transfer the one or more digital media files.

BRIEF DESCRIPTION OF THE SEVERAL VIEWS OF THE DRAWINGS

For a more complete understanding of the nature of the present disclosure, reference should be had to the following detailed description taken in connection with the accompanying drawings in which:

FIG. 1 is a schematic representation of at least one embodiment of the system for enabling social interactive wireless communication as disclosed in accordance with the present disclosure.

Like reference numerals refer to like parts throughout the several views of the drawings.

DETAILED DESCRIPTION

Figure 1:
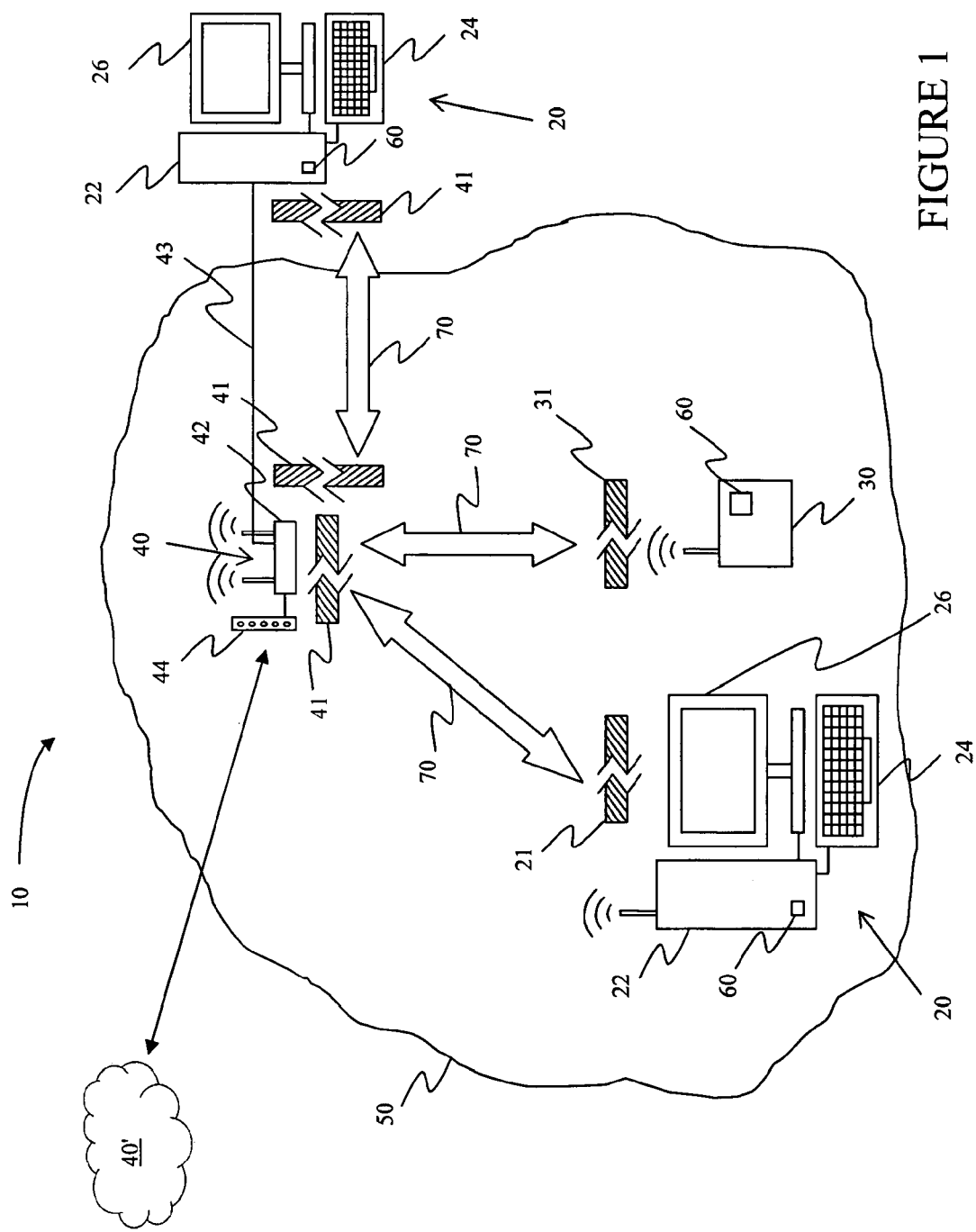
FIG. 1 is a schematic representation of one embodiment of the digital media communication protocol in accordance with the present specification.
Figure 2:
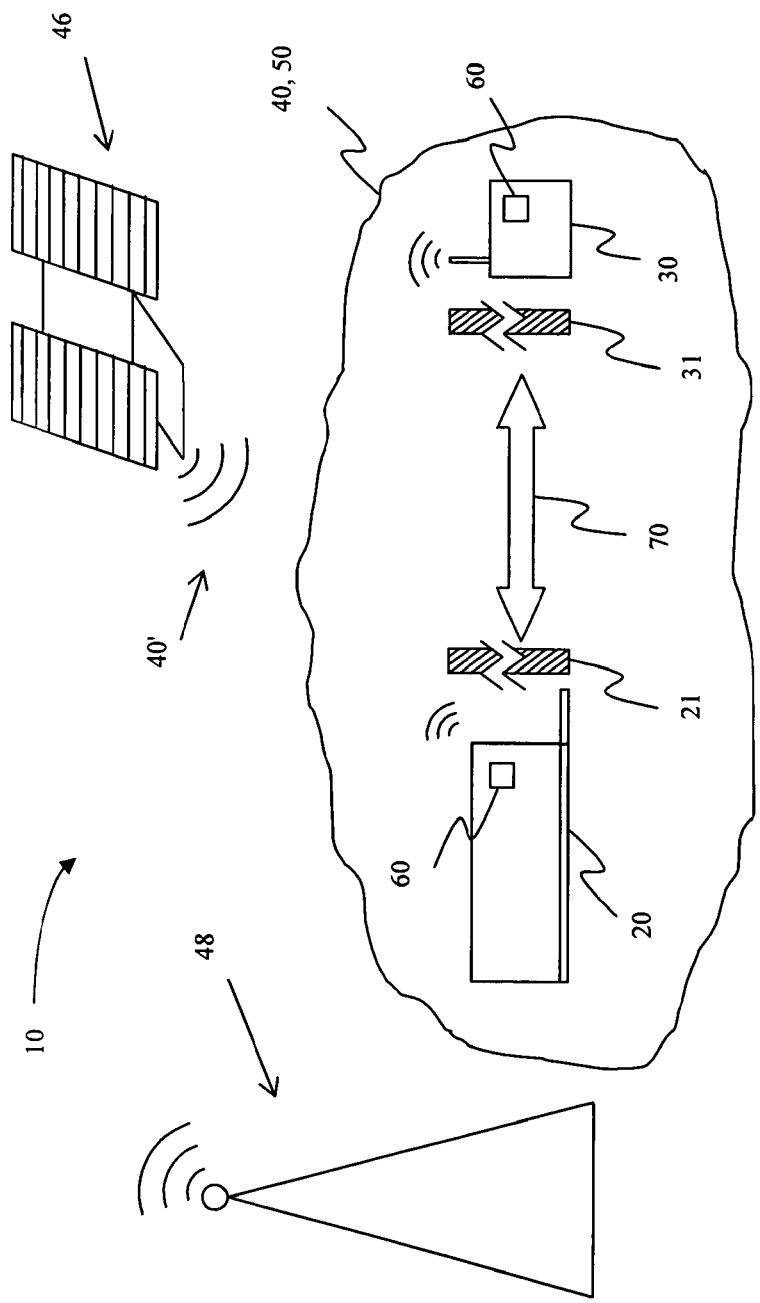
FIG. 2 is a schematic representation of another embodiment of the digital media communication protocol in accordance with the present specification.
Figure 3:
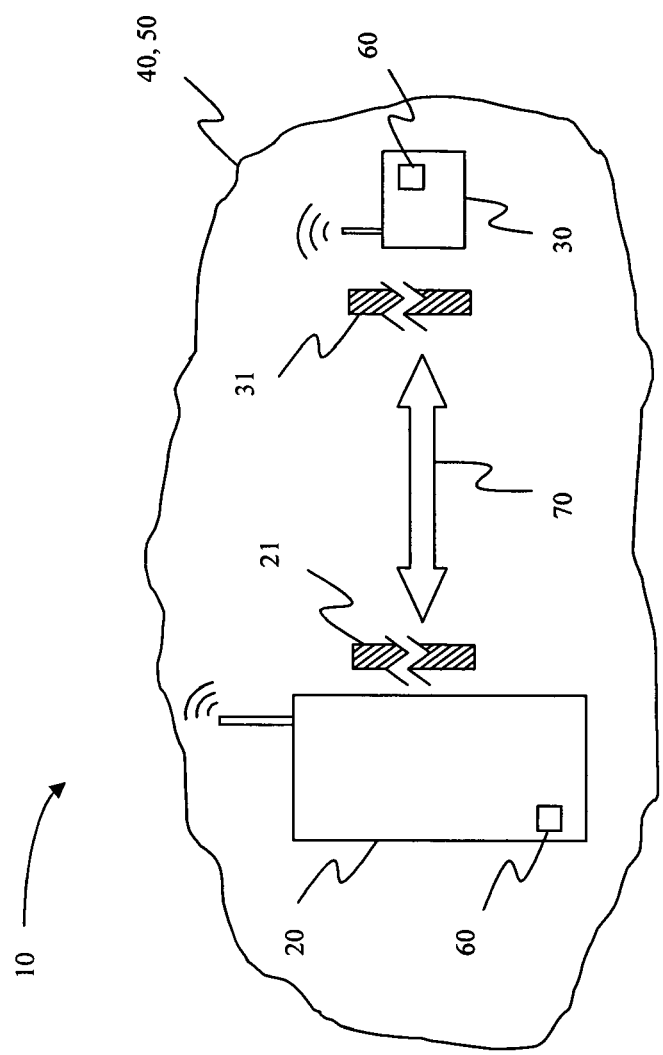
FIG. 3 is a schematic representation of yet another embodiment of the digital media communication protocol in accordance with the present specification.

As shown in the accompanying drawings, the present specification relates to a digital media communication protocol, generally indicated as 10. As illustrated in FIGS. 1 through 3, at least one embodiment of the present protocol or system 10 includes one or more media terminals 20 and one or more media nodes 30. In particular, the media terminal(s) 20 of at least one embodiment is disposed in an accessible relation to at least one interactive computer network 40 and may include, for example, a computer processing device 22, an input device 24, and a display device 26. Accordingly, as shown in FIG. 1, the media terminal(s) 20 of the various embodiments described herein may include a computer, however, any device structured to facilitate the practice of the present system in the intended fashion may be utilized, including but in no way limited to a desktop computer, laptop or notebook computer, PDA, video game console, mobile telephone, media system of a vehicle (e.g., an automobile), etc.

The media node(s) 30 of at least one embodiment of the present system 10 generally includes a portable device such as a cellular or mobile telephone, PDA, portable mp3 player, laptop or notebook computer, or any other digital media device structured to facilitate the practice of the present system in the intended manner. In at least one embodiment, however, the media node 30 is not limited to a portable device, and may include a more stationary device or structure such as, for example, a desktop computer.

Furthermore, the various embodiments of the present specification include at least one interactive computer network 40, 40'. In particular, as illustrated in FIG. 1, at least one embodiment includes one or more home, office, private, limited, or closed interactive computer networks 40 at least partially defined by one or more networking devices 42, including but not limited to a router, access point, and/or switch. Accordingly, the interactive computer network 40 may include a Local Area Network ("LAN"), Wide Area Network ("WAN"), Private Area Network ("PAN"), peer-to-peer network, near field communication ("NFC"), Bluetooth network, etc. As best shown in FIGS. 2 and 3, it is also contemplated that, especially wherein the interactive computer network 40 is a Bluetooth or peer-to-peer network, the media terminal(s) 20 and/or the media node(s) 30 can function as the networking device(s) 42, at least to the extent of defining the interactive computer network 40. Additionally, and referring again to FIG. 1, at least one interactive computer network 40' of at least one embodiment includes access to the World Wide Web, for example via the Internet. Such access to the World Wide Web 40' may be facilitated in any manner, including but not limited to, via a cable or DSL modem 44, as shown in FIG. 1, or via one or more satellites 46 and/or one or more towers or base stations 48, as illustrated in FIG. 2.

In addition, and still referring to FIGS. 1 through 3, at least one embodiment of the present system 10 includes a wireless range 50 structured to permit access to the one or more interactive computer networks 40. In particular, as shown in FIG. 1, the wireless range 50 may be at least partially defined by networking devices 42, such as a wireless router, access point, switch, etc. In yet another embodiment, as shown in FIGS. 2 and 3, however, the wireless range 50 may be partially defined by the media terminal 20 and/or media node 30, such as, for example, wherein the interactive computer network 40 includes a Bluetooth or peer-to-peer network.

In addition, and as an attempt to minimize or eliminate unauthorized access or security breaches to the interactive computer network 40, the interactive computer network 40 and/or the various networking device(s) 42 may include one or more networking device security measures 41 including a firewall, and/or passwords/keys such as, for example, Wi-Fi Protected Access ("WPA") keys, and/or Wireless Application Protocol ("WAP") keys. Accordingly, only authorized individuals or computers may generally have access to the interactive computer network 40 through the firewall, via use of the password(s)/key(s), and/or any other networking device security measure(s) 41.

The present system 10 further includes at least one digital media file 60 initially disposed or saved on at least one of the media terminal(s) 20 or media node(s) 30. Specifically, the digital media file(s) 60 may be disposed on the media terminal(s) 20, the media node(s) 30, or both. However, it should be apparent that for purposes of the present system 10, the digital media file 60 need not necessarily be created or originated on either the media terminal(s) 20 or the media node(s) 30. In particular, the digital media file(s) 60 may include virtually any electronic file or data such as a digital photograph, video, audio, animation, text, or any other electronic document or object.

Moreover, in at least one embodiment of the present system 10, the media node(s) 30 is disposable within the wireless range 50, wherein the media node 30 is detectable by the media terminal 20. In particular, as stated above, in at least one embodiment, the media node 30 includes a portable device, such as a mobile or cellular phone, PDA, laptop, etc. Accordingly, the media node 30 may be disposed within, i.e., enter, the confines of the wireless range 50, for example, when a user or individual carries the media node 30 therein. In addition, for purposes of the present system 10, the media node 30 may be disposed within the wireless range 50 when the device is powered on, activated, or otherwise configured into a discoverable and/or detectable state while simultaneously being physically disposed within the confines of the wireless range 50, and as such, the media node 30 need not necessarily be portable or easily movable. For instance, while physically disposed within the confines of the wireless range 50, the media node(s) 30 may be powered on or otherwise have wireless or Bluetooth capabilities activated.

Furthermore, the media terminal(s) 20 disposed in accessible relation to the interactive computer network 40 are structured to detect the media node(s) 30 as the media node(s) 30 is disposed within the confines of or is otherwise detectable within the wireless range 50. Particularly, in at least one embodiment, each media node 30 includes a node identifier structured to distinguish one media node 30 within the wireless range 50 from another. For example, the node identifier may include a device name, model/serial number, Media Access Control ("MAC") address, or Internet Protocol ("IP") address. Accordingly, as the media node 30 enters or is otherwise disposed within the wireless range 50, the media terminal 20 is structured to detect and/or identify the media node 30, for example, by the corresponding node identifier.

In addition, at least one embodiment of the present system 10 includes a terminal program disposed in an accessible relation to the media terminal 20. In particular, the terminal program of at least one embodiment is a computer software program structured to facilitate the practice of the present system 10 in the intended fashion, at least from the media terminal 20 side of the system 10. The terminal program, of at least one embodiment, may be disposed on the media terminal 20, such as, for example, on a hard drive, or other memory device associated with the media terminal 20. In yet another embodiment, however, the terminal program may be accessible via the at least one interactive network 40, 40', such as, for example, via the World Wide Web. For example, in the embodiment wherein the terminal program is accessible via the World Wide Web, a user may direct a web browser disposed in the media terminal 20 to a particular web site, which then runs or executes the terminal program and/or downloads the terminal program to the media terminal 20.

Either way, the terminal program may include at least one script which is structured to consistently or periodically monitor the wireless range 50 associated with the interactive computer network 40 for the existence of media nodes 30. When a media node 30 is disposed within the wireless range 50, the terminal program may be structured or configured to automatically alert a user at the media terminal 20 of the existence or detection of the media node 20. In particular, the terminal program may deploy a pop-up display, play an audio alarm or tone, etc. On the other hand, the terminal program may be structured or configured to alert or notify the user of any detected media nodes 30 only upon the user's specific instructions. For example, the media terminal 20, and in particular the terminal program thereof, may be structured to list or display the media nodes 30 currently disposed within the wireless range 50 upon the user clicking on or otherwise manipulating a corresponding option of the terminal program.

At least one embodiment of the present system 10 further includes a communication link 70 structured to dispose the media terminal(s) 20 and the media node(s) 30 in a communicative relation with one another via the interactive computer network 40. In particular, the communication link 70 of the various embodiments of the present system 10 is created and/or requested by the media terminal 20. As stated above, the media terminal 20 is structured to detect the media node(s) 30 disposed within the wireless range 50. As also stated above, the media node 30 may, but need not, however, be configured to have access to the interactive computer network 40. For example, the interactive computer network 40 and/or the corresponding networking device(s) 42 may be equipped with one or more security measures 41, including a WEP key or other password. The media node 30 may, but need not have access to the WEP key or other security measure 41 so as to access the corresponding interactive computer network 40. Even so, the media terminal 20 is structured to create and/or initiate a communication link 70 with the one or more detected media nodes 30 disposed within the wireless range 50, for example, by sending and/or transmitting a request to the corresponding media node(s) 30 to establish a communication link 70 therewith via the interactive computer network 40. As illustrated in FIG. 1, the media terminal 20 need not be disposed within the wireless range 50 in order to detect the media nodes 30 or to create and/or initiate a communication link 70 therewith. In at least one embodiment of the present system 10, the media terminal 20 does, however, need to be disposed in an accessible relation with the interactive computer network 40, for example, wirelessly or via a direct cable 43.

More in particular, the communication link 70 of at least one embodiment of the present specification is structured to bypass one or more media terminal security measures 21, media node security measures 31, and/or networking device security measures 41. Moreover, the security measures 21, 31, 41 may includes passwords, keys, firewalls, etc. structured to minimize or eliminate unauthorized access to the corresponding media terminal 20, media node 30, networking device(s) 42, and/or interactive computer network 40, 40'. Referring again to FIG. 1, in the embodiment wherein the interactive computer network 40 and the wireless range 50 are at least partially defined by networking device(s) 42, such as a router, access point, or switch, once established, the communication link 70 is structured to be disposed between the media terminal 20 and the media node 30, and through the corresponding networking device(s) 42. Particularly, in at least one implementation of the present system 10, because the media terminal 20 is disposed in an accessible relation to the interactive computer network 40, and because the communication link 70 is created and/or initiated by the media terminal 20, the communication link 70 can be established regardless of whether the corresponding media node 30 independently has access to the interactive computer network 40. In addition, the initiation of the communication link 70 by the media terminal 20, such as through a request to establish a communication link 70, at least partially allows the communication link 70 to bypass the firewall or other media terminal security measure(s) 21.

Moreover, the media terminal 20 of at least one embodiment of the present system 10 may be structured or configured to automatically create and/or initiate a communication link 70 with the detected media nodes 30. However, more practically, a user in control of the media terminal 20 may direct the media terminal 20 to create and/or initiate the communication link 70 with one or more selected media node(s) 30, for example, via the terminal program. Similarly, the media node 30 may be structured or configured to automatically accept or decline creation of the communication link 70 initiated by the media terminal 20. However, in at least one embodiment of the present system 10, the media node(s) 30 may be structured or configured for a user in control of the media node 30 to selectively accept or decline the creation or establishment of a communication link 70 initiated by the corresponding media terminal 20. As such, in at least one embodiment, the media node 30 includes one or more node programs structured to facilitate the practice of the present system 10 in the intended fashion, at least from the media node 30 side of the system 10.

Once the communication link 70 is initiated, accepted, and/or ultimately established between the media terminal 20 and the media node 30, the digital media file(s) 60 may be selectively transmitted therebetween. In particular, if the digital media file 60 is initially disposed on the media node 30, the media node 30 and the media terminal 20 may cooperatively communicate via the communication link 70 such that the digital media file 60 may be transmitted from the media node 30 to the media terminal 20. In addition, the converse is also true. Particularly, if the digital media file 60 is disposed on the media terminal 20, the media node 30 and the media terminal 20 may cooperatively communicate via the communication link 70 such that the digital media file 60 may be transmitted from the media terminal 20 to the media node 30. Furthermore, in at least one embodiment of the present system 10, the device on which the digital media file 60 is initially disposed, such as the media node 30 or the media terminal 20, is structured to "push" the digital media file 60 to the receiving device 20, 30 via the communication link 70. Similarly, in at least one embodiment, once the communication link 70 is established, the receiving device 20, 30 is structured to "pull" the digital media file 60 from the transmitting device 30, 20 via the communication link 70.

For illustrative purposes only, the communication link 70, the terminal program, and/or the node program may be structured to include a selective set of parameters which define or limit the permissions associated with the communication link 70. In particular, in at least one embodiment, the selective set of parameters may include the option of transmitting the digital media file 60 via the communication link 70 merely for purposes of displaying and/or playing the digital media file 60, saving the digital media file 60, manipulating or otherwise editing the digital media file 60, etc. In the various embodiments of the present system 10, it is contemplated that these parameters may be selected from either the media terminal 20 or the media node 30, at various times. For instance, the parameters may be selected by the media terminal 20, or a user in control thereof, when the communication link 70 is created and/or initiated, or by either the media terminal 20 or the media node 30 when the communication link 70 is accepted or created.

Furthermore, it is contemplated that the protocol 10 of the present system includes a plurality of versions of the terminal program and/or the node program, stated and described above. For instance, at least one embodiment includes at least one limited version of the terminal and/or node programs and at least one full version of the programs. It is contemplated that the limited versions of the terminal and/or node programs are distributed at no cost or at least a lower cost than the corresponding full versions, and as such, provide limited functionality. Of course, the terminal and/or node programs, whether the limited and/or full versions, may come pre-installed with the corresponding media terminal 20 or media node 30.

Figure 4:
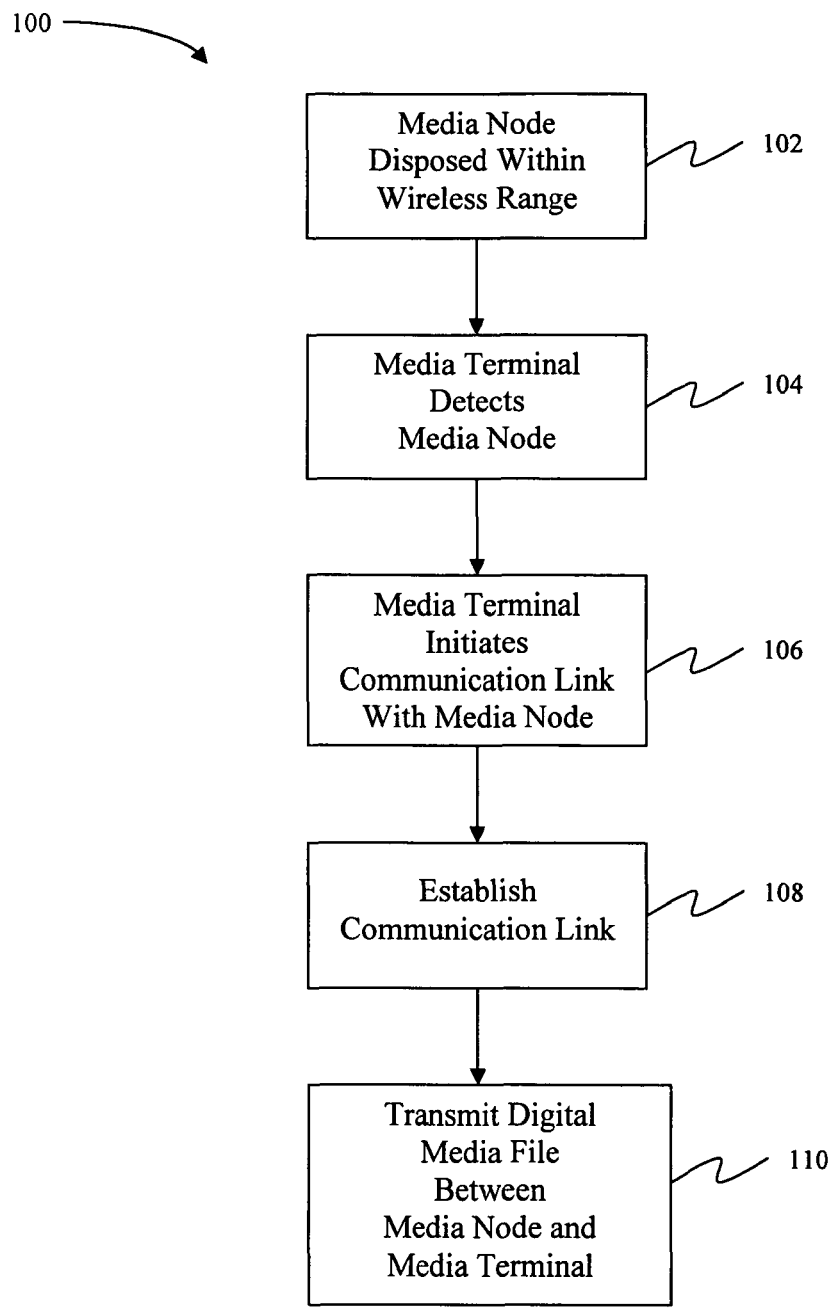
FIG. 4 is a partial flow chart of at least one illustrative implementation of the digital media communication protocol of the present specification.

Moreover, for illustrative purposes only, FIG. 4 shows one implementation of the system 10 in accordance with the present specification, generally indicated as 100. In particular, and as above, in at least one embodiment, the media node 30 may include a portable device, such as for example, a mobile phone, a cellular telephone, PDA, or mobile computer. For purposes of the illustrative implementation of FIG. 4, the interactive computer network 40 includes a wireless range 50 located in one or more offices or rooms, wherein the media terminal 20 is also disposed within one of the offices or rooms in accessible relation to the interactive computer network 40.

Furthermore, the digital media file 60 of the present illustrative implementation of FIG. 4 may be disposed on the media node 30, whereas the user in control of the media node 30 desires to display the digital media file 60 on the display device 26 of the media terminal 20. For example, a user of a wireless mobile device (i.e., an example of a media node 30) can use the wireless mobile device to control the display of a digital media file 60 on a display (i.e., an example of display device 26) of a vehicle media system (i.e., an example of a media terminal 20) within an automobile. The vehicle media system may be part of a vehicle navigation system. Alternatively, the vehicle media system may include one or more displays within the vehicle that are separate from the vehicle navigation system. In another aspect, the vehicle media system includes an audio system (e.g., the radio) of the vehicle.

As shown in FIG. 4, the media node 30 may be disposed within the wireless range 102. For example, the user in control of, and/or having possession of, the media node 30 may walk into the office which is disposed within the wireless range 50. As stated above, once the media node 30 is disposed within the wireless range 50, as shown at 104, the media terminal 20 is structured to detect the media node 20. The media terminal 20 may then create and/or initiate a communication link 70 between the media terminal 20 and the media node 30 via the interactive computer network 40, as shown at 106, for instance, by sending a request thereto. The media node 30 may then accept the request by the media terminal 20, which establishes the communication link 70, as illustrated at 108 in FIG. 4. Once the communication link 70 is established, the digital media file 60 may be transmitted, i.e., "pushed" or "pulled", between the media node 30 and the media terminal 20, as shown at 110.

More in particular, because the digital media file 60, for purposes of the illustrative implementation shown in FIG. 4, is initially disposed on the media node 30, the digital media file 60 may be transmitted, i.e., "pushed" or "pulled", to the media terminal 20 from the media node 30 via the communication link 70. In particular, the media terminal 20 may display the digital media file 60, save the digital media file 60, and/or manipulate or edit the digital media file 60. In addition, the media terminal 20, in at least one embodiment, may be structured to transmit the digital media file 60 and/or the edited media file back to the media node 30 via the communication link 70.

What is claimed is:

1. A media system, comprising:
   at least one media terminal disposed in an accessible relation to at least one interactive computer network,
   a wireless range structured to permit authorized access to said at least one interactive computer network,
   at least one media node disposable within said wireless range, wherein said at least one media node is detectable by said at least one media terminal,
   at least one digital media file initially disposed on at least one of said at least one media terminal or said at least one media node, said at least one media terminal being structured to detect said at least one media node disposed within said wireless range,
   a communication link structured to dispose said at least one media terminal and said at least one media node in a communicative relation with one another via said at least one interactive computer network,
   said communication link being initiated by said at least one media terminal,
   said at least one media node and said at least one media terminal being structured to transmit said at least one digital media file therebetween via said communication link, and
   said communication link is structured to bypass at least one media terminal security measure for a limited permissible use of the communication link by the media node to only transferring the at least one digital media file to, and displaying the at least one digital media file on, the at least one media terminal.

2. The method of claim 1, wherein the security measure is a firewall.

3. The method of claim 1, wherein the transmission of the media file from the at least one media node to the at least one media terminal completely bypasses the security measure.

4. The method of claim 1, wherein the at least one media terminal is a navigation system.

5. The method of claim 1, wherein the at least one media terminal is an audio system.

6. The system of claim 1, wherein the communication link is at least one of a peer-to-peer connection, bluetooth connection, and a WiFi connection.

7. The system of claim 1 wherein the at least one digital media file is at least one of an image file, video file, gaming file, and a streaming video file.

8. The system of claim 1, further comprising presenting the at least one digital media file on a display.

9. The system of claim 1, wherein the at least one digital media file is provided by the at least one media node.

10. The system of claim 1, wherein the at least one digital media file is received from a server upon instructions provided by the at least one media node.

11. The system of claim 1, wherein the at least one digital media file is received from a server upon instructions provided by the wireless mobile device.

12. A media system configured to receive a media file from a wireless mobile device over communication network, comprising:
   a wireless receiver;
   a security measure; and
   the media system disposed in an accessible relation to at least one interactive computer network that has a wireless range structured to permit authorized access to said at least one interactive computer network,
   the wireless mobile device within said wireless range, wherein said wireless mobile device is detectable by said media system,
   at least one digital media file initially disposed on the wireless mobile device, said media system being structured to detect said wireless mobile device disposed within said wireless range,
   a communication link structured to dispose said media system and said wireless mobile device in a communicative relation with one another via said at least one interactive computer network,
   said communication link being initiated by said media system,
   said wireless mobile device and media system being structured to transmit said at least one digital media file therebetween via said communication link, and
   said communication link is structured to bypass the security measure of the media system for a limited permissible use of the communication link by the wireless mobile device for only transferring the at least one digital media file to, and displaying the at least one digital media file on, the media system.

13. The media system of claim 12, wherein the security measure is a firewall.

14. The media system of claim 12, wherein the transmission of the at least one digital media file from the wireless mobile device to the media system completely bypasses the security measure.

15. The media system of claim 12, wherein the media system is a navigation system.

16. The media system of claim 12, wherein the media system is an audio system.

17. The media system of claim 12, wherein the communication link is at least one of a peer-to-peer connection, bluetooth connection, and a WiFi connection.

18. The media system of claim 12 wherein the at least one digital media file is at least one of an image file, video file, gaming file, and a streaming video file.

19. The media system of claim 12, wherein the further media system is configured to present the at least one digital media file on a display.

20. The media system of claim 12, wherein the at least one media file is provided by the wireless mobile device.

21. The media system of claim 12, wherein the at least one digital media file is received from a server upon instructions provided by the wireless mobile device.

22. A method of transferring a media file from a wireless mobile device to a media system over a communication network, the media system including a security measure, comprising:
   disposing the media system in an accessible relation to at least one interactive computer network that has a wireless range structured to permit authorized access to said at least one interactive computer network, wherein the wireless mobile device within said wireless range, wherein said wireless mobile device is detectable by said media system,
   initially disposing at least one digital media file on the wireless mobile device, said media system being structured to detect said wireless mobile device disposed within said wireless range,
   structuring a communication link to dispose said media system and said wireless mobile device in a communicative relation with one another via said at least one interactive computer network,
   initiating said communication link by said media system,
   transmitting by said wireless mobile device to the media system said at least one digital media file therebetween via said communication link, and
   wherein said communication link is structured to bypass the security measure of the media system for a limited permissible use of the communication link by the wireless mobile device for only transferring the at least one digital media file to, and displaying the at least one digital media file on, the media system.

23. The method of claim 22, wherein the security measure is a firewall.

24. The method of claim 22, wherein the transmission of the at least one digital media file from the wireless mobile device to the media system completely bypasses the security measure.

25. The method of claim 22, wherein the media system is a navigation system.

26. The method of claim 22, wherein the media system is an audio system.

27. The method of claim 22, wherein the communication link is at least one of a peer-to-peer connection, bluetooth connection, and a WiFi connection.

28. The method of claim 22, wherein the at least one digital media file is at least one of an image file, video file, gaming file, and a streaming video file.

29. The method of claim 22, further comprising presenting the at least one digital media file on a display.

30. The method of claim 22, wherein the at least one digital media file is provided by the wireless mobile device.

31. The method of claim 22, wherein the at least one digital media file is received from a server upon instructions provided by the wireless mobile device.

32. A wireless mobile device configured to transmit a media file to a media system over a communication network having a security measure comprising:
   the media system disposed in an accessible relation to at least one interactive computer network that has a wireless range structured to permit authorized access to said at least one interactive computer network,
   the wireless mobile device within said wireless range, wherein said wireless mobile device is detectable by said media system,
   at least one digital media file initially disposed on the wireless mobile device, said media system being structured to detect said wireless mobile device disposed within said wireless range,
   a communication link structured to dispose said media system and said wireless mobile device in a communicative relation with one another via said at least one interactive computer network,
   said communication link being initiated by said media system,
   said wireless mobile device and media system being structured to transmit said at least one digital media file therebetween via said communication link, and
   said communication link is structured to bypass the security measure of the media system for a limited permissible use of the communication link by the wireless mobile device for only transferring the at least one digital media file to, and displaying the at least one digital media file on, the media system.

33. The wireless mobile device of claim 32, wherein the security measure is a firewall.

34. The wireless mobile device of claim 32, wherein the transmission of the at least one digital media file from the wireless mobile device to the media system completely bypasses the security measure.

35. The wireless mobile device of claim 32, wherein the media system is a navigation system.

36. The wireless mobile device of claim 32, wherein the media system is an audio system.

37. The device of claim 32, wherein the communication link is at least one of a peer-to-peer connection, bluetooth connection, and a WiFi connection.

38. The device of claim 32 wherein the at least one digital media file is at least one of an image file, video file, gaming file, and a streaming video file.

39. The device of claim 32, wherein the device is configured to present the at least one digital-media file on a display.

40. The device of claim 32, wherein the at least one digital media file is provided by the wireless mobile device.

41. The device of claim 32, wherein the at least one digital media file is received from a server upon instructions provided by the wireless mobile device.

42. A transfer system from transferring a media file over a communication network, comprising a media system; and a wireless mobile device, wherein the media system includes:
   a wireless receiver,
   a security measure, and
   a processor configured to
   the media system disposed in an accessible relation to at least one interactive computer network that has a wireless range structured to permit authorized access to said at least one interactive computer network, the wireless mobile device within said wireless range, wherein said wireless mobile device is detectable by said media system, at least one digital media file initially disposed on the wireless mobile device, said media system being structured to detect said wireless mobile device disposed within said wireless range, a communication link structured to dispose said media system and said wireless mobile device in a communicative relation with one another via said at least one interactive computer network, said communication link being initiated by said media system, said wireless mobile device and media system being structured to transmit said at least one digital media file therebetween via said communication link, and said communication link is structured to bypass the security measure of the media system for a limited permissible use of the communication link by the wireless mobile device for only transferring the at least one digital media file to, and displaying the at least one digital media file on, the media system.

43. The transfer system of claim 42, wherein the security measure is a firewall.

44. The transfer system of claim 42, wherein the transmission of the at least one digital media file from the wireless mobile device to the media system completely bypasses the security measure.

45. The transfer system of claim 42, wherein the media system is a navigation system.

46. The transfer system of claim 42, wherein the media system is an audio system.

47. The system of claim 42, wherein the communication link is at least one of a peer-to-peer connection, bluetooth connection, and a WiFi connection.

48. The system of claim 42 wherein the at least one digital media file is at least one of an image file, video file, gaming file, and a streaming video file.

49. The system of claim 42, wherein the system is configured to present the at least one digital media file on a display.

50. The system of claim 42, wherein the at least one digital media file is provided by the wireless mobile device.

* * * * *